(12) United States Patent
Zen et al.

(10) Patent No.: US 6,562,908 B2
(45) Date of Patent: May 13, 2003

(54) THERMOPLASTIC RESIN COMPOSITION AND SHAPED ARTICLES THEREOF

(75) Inventors: Shinichiro Zen, Tokyo (JP); Akira Shimizu, Mie-ken (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 10/040,351

(22) Filed: Jan. 9, 2002

(65) Prior Publication Data

US 2002/0128392 A1 Sep. 12, 2002

(30) Foreign Application Priority Data

Jan. 11, 2001 (JP) ........................................ 2001-003745

(51) Int. Cl.$^7$ .................... C08L 23/00; C08L 33/00; C08L 45/00; C08L 53/02
(52) U.S. Cl. .................... 525/191; 525/216; 525/221; 525/222; 525/232; 525/240; 525/241
(58) Field of Search ................................. 525/191, 221, 525/222, 216, 232, 240, 241

(56) References Cited

U.S. PATENT DOCUMENTS

| 5,053,471 A | 10/1991 | Goto et al. |
| 5,202,388 A | 4/1993 | Ilo et al. |
| 5,409,996 A | 4/1995 | Shinohara et al. |

FOREIGN PATENT DOCUMENTS

| JP | 03-072558 | 3/1991 |

*Primary Examiner*—Nathan M. Nutter
(74) *Attorney, Agent, or Firm*—Oblon, Spivak, McClelland, Maier & Neustadt, P.C.

(57) ABSTRACT

Described are a thermoplastic resin composition containing (A): one or more rubber reinforced thermoplastic resins, (B): one or more acrylic resins and (C): one or more thermoplastic norbornene resins, and further containing (D): one or more styrenic resins other than (A) and (E): coloring agents as needed, and a shaped article obtained by forming the composition. Described thermoplastic resin composition is excellent in heat resistance, strength and processability, and excellent in laser marking properties, so that it is useful for various applications.

11 Claims, No Drawings

THERMOPLASTIC RESIN COMPOSITION AND SHAPED ARTICLES THEREOF

FIELD OF THE INVENTION

The present invention relates to a composition containing one or more rubber reinforced thermoplastic resins and one or more thermoplastic norbornene resins, and further to shaped articles thereof, which exhibits good visibility of printed areas and excellent marking adaptability by irradiation of laser beams.

BACKGROUND OF THE INVENTION

Rubber reinforced thermoplastic resins represented by ABS resins are excellent in their strength and processability, so that they have widely been used for various applications as shaped articles.

As to shaped articles, designs such as letters, symbols, patterns and pictures are printed on surfaces thereof by tampon printing or silk-screen printing, and such shaped articles have been used for various applications. However, these methods have problems such as poor printing caused by scattering of ink, and difficulty of printing on uneven areas and printing of minute letters. Further, when consideration is given to recycling of shaped articles on which the designs are printed by tampon printing or silk-screen printing, it is necessary to recycle shaped articles after removal of printed areas. With respect to recent market needs toward recycling and environmental correspondence, methods of doing printing with lasers have been employed.

However, when the rubber reinforced thermoplastic resins such as ABS resins are applied to applications which are used in fields requiring heat resistance and used for laser marking, they have problems that the degree of color development and the clarity of letters or symbols are insufficient.

On the other hand, as thermoplastic norbornene resins, there have been known addition (co) polymers of norbornene derivatives and ring-opening (co)polymers of norbornene derivatives. These thermoplastic norbornene resins have good optical properties, low moisture absorption and excellent heat resistance, so that applications thereof in various fields have been expected.

However, thermoplastic norbornene resins have disadvantages of low impact resistance and poor toughness. Japanese Patent Laid-open Publication (Sho) 57-3701 discloses that rubber polymers are mixed with norbornene resins for overcoming these disadvantages. However, the sufficient effect can not always be obtained, and other properties thereof are rather deteriorated in some cases.

Recently, needs of durability under hard conditions such as high temperature and humidity to resin materials become strong, so that new resin materials which have not only good mechanical properties and adaptability for laser marking, but also excellent durability under hard conditions.

SUMMARY OF THE INVENTION

The present inventors have conducted intensive investigation on above-mentioned problems. As a result, the inventors have discovered that a thermoplastic resin composition which have excellent heat resistance, strength, toughness, processability and adaptability for laser marking is obtained by further adding one or more acrylic resins to one or more rubber reinforced thermoplastic resins and one or more thermoplastic norbornene resins, thereby completing the invention.

According to the present invention, new thermoplastic resin composition containing (A): one or more rubber reinforced thermoplastic resins (component (A)), (B): one or more acrylic resins (component (B)) and (C): one or more thermoplastic norbornene resins (component (C)) is provided.

The thermoplastic resin composition contains, preferably, 1 part to 95 parts by weight of component (A), 1 part to 90 parts by weight of component (B) and 1 part to 95 parts by weight of component (C), and more preferably, 10 parts to 80 parts by weight of component (A), 2 parts to 50 parts by weight of component (B) and 10 parts to 80 parts by weight of component (C)(wherein (A)+(B)+(C)=100 parts by weight).

Further, according to the present invention, there is provided a thermoplastic resin composition containing component (A), component (B), component (C) and (D): one or more styrenic resins other than those included in component (A) (component (D)).

The thermoplastic resin composition contains, preferably, 1 part to 95 parts by weight of component (A), 1 part to 90 parts by weight of component (B), 1 part to 95 parts by weight of component (C) and 1 part to 95 parts by weight of component (D) (wherein (A)+(B)+(C)+(D)=100 parts by weight).

Furthermore, the present invention provides shaped articles obtained by forming above-mentioned thermoplastic resin composition, and further provides shaped articles in which marking is made with laser beams.

DESCRIPTION OF THE PREFERRED EMBODIMENTS

Component (A): Rubber Reinforced Thermoplastic Resins

Rubber reinforced thermoplastic resins are copolymers obtained by, for example, copolymerizing rubber polymers with monomers copolymerizable therewith or monomer mixtures such as aromatic vinyl compounds, vinyl cyanide compounds, (meth)acrylates, maleic anhydride, maleimide compounds and other vinyl monomers copolymerizable therewith.

Examples of rubber polymers for obtaining component (A) include ethylene-α-olefin copolymers such as ethylene-propylene random and block copolymers and ethylene-butene random and block copolymers; ethylene-unsaturated carboxylic acid ester copolymers such as ethylene-methacrylate and ethylene-butyl acrylate copolymers; ethylene-fatty acid vinyl copolymers such as ethylene-vinyl acetate copolymers; ethylene-propylene-non-conjugated diene terpolymers such as ethylene-propylene-ethylidenenorbornene and ethylenepropylene-hexadiene copolymers; random and block copolymers of polybutadiene, isoprene and styrene-butadiene, and hydrogenated products of these random and block copolymers; diene rubber such as acrylonitrile-butadiene and butadiene-isoprene copolymers; butylene-isoprene copolymers; and silicone rubber. These can be used not only alone, but also as a combination of two or more of them.

Of these, rubber polymers preferred in terms of their properties are diene rubber, ethylene-propylene rubber and ethylene-propylene-non-conjugated diene terpolymers.

Examples of aromatic vinyl compounds copolymerized in the presence of rubber polymers include styrene, α-methylstyrene, p-methylstyrene, vinylxylene, monochlorostyrene, dichlorostyrene, monobromostyrene, dibromostyrene, p-t-butylstyrene, ethylstyrene, vinylnaphthalene and dimethylstyrene. These can be used not only alone, but also as a combination of two or more of them. Of these, preferably used is styrene.

Examples of maleimide compounds include maleimide, N-methylmaleimide, N-ethylmaleimide, N-phenylmaleimide, N-o-chlorophenylmaleimide and N-cyclohexylmaleimide, and preferred are N-phenylmaleimide, N-o-chlorophenylmaleimide and N-cyclohexyl-maleimide. These can be used not only alone, but also as a combination of two or more of them.

Examples of vinyl cyanide compounds include acrylonitrile and methacrylonitrile. Of these, preferred is acrylonitrile.

Examples of other copolymerizable vinyl compounds include alkyl acrylates such as methyl acrylate, ethyl acrylate and propyl acrylate; alkyl methacrylates such as methyl methacrylate, ethyl methacrylate and propyl methacrylate; and unsaturated acid anhydrides such as maleic anhydride, itaconic anhydride and citraconic anhydride. These can be used not only alone, but also as a combination of two or more of them.

Specific examples of component (A) as described above include acrylonitrilebutadiene-styrene resins (ABS resins), acrylonitrile-ethylene-propylene-styrene resins (AES resins), methyl methacrylate-butadiene-styrene resins (MBS resins), acrylonitrile-butadiene-methyl methacrylate-styrene resins (ABMS resins), acrylonitrile-n-butyl acrylate-styrene resins (AAS resins) and rubber-modified polystyrene (high impact polystyrene). These can be used not only alone, but also as a combination of two or more of them. Of these, ABS resins are particularly preferred.

Component (B): Acrylic Resins

Acrylic resins include polymers of acrylic monomers and copolymers of acrylic monomers and other copolymerizable monomers.

Acrylic monomers include alkyl acrylates each having an alkyl group of 1 to 8 carbon atoms such as methyl acrylate, ethyl acrylate, propyl acrylate, butyl acrylate, hexyl acrylate and octyl acrylate; and alkyl methacrylates each having an alkyl group of 1 to 8 carbon atoms such as methyl methacrylate, ethyl methacrylate, propyl methacrylate, butyl methacrylate, hexyl methacrylate and octyl methacrylate. Component (B) can be obtained by (co)polymerizing at least one of these monomers.

Of these monomers, preferred are methyl methacrylate and butyl acrylate.

Further, monomers copolymerizable with acrylic monomers include aromatic vinyl compounds, maleimide compounds and vinyl cyanide compounds.

Specific examples of these monomers include monomers mentioned in the description of above-mentioned component (A). Of these, preferred are styrene, p-styrene, α-methylstyrene, N-phenylmaleimide and N-cyclohexylmaleimide.

As to Component (B), when acrylic monomers and copolymerizable monomers are copolymerized, the composition ratio of acrylic monomers to the total of acrylic monomers and copolymerizable monomers is from 3% to 97% by weight, preferably from 5% to 95% by weight, and more preferably from 10% to 90% by weight.

Preferred examples of Component (B) include methyl methacrylate polymers and methacrylic acid-styrene copolymers.

Component (C): Thermoplastic Norbornene Resins

Thermoplastic norbornene resins used in the present invention include polymers shown in the following (1) to (5):

(1) Addition polymers or ring-opening polymers of monomers represented by the following general formula (1) (hereinafter referred to as "specific monomers");

(2) Addition copolymers or ring-opening copolymers of specific monomers and copolymerizable monomers;

(3) Hydrogenated polymers of above-mentioned ring-opening (co)polymers;

(4) (Co)polymers obtained by cyclizing above-mentioned ring-opening (co)polymers by the Friedel-Crafts reaction, and then, hydrogenating the resulting products; and (5) Saturated copolymers of specific monomers and compounds containing olefinic carbon-carbon double bonds.

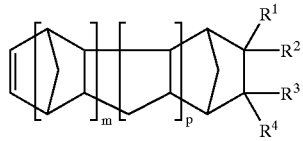

(1)

wherein $R^1$ to $R^4$ independently represent hydrogen atoms, halogen atoms, substituted or unsubstituted hydrocarbon groups or other polar groups each having 1 to 30 carbon atoms which may have a linkage group containing one or more oxygen, nitrogen, sulfur or silicon atoms; $R^1$ and $R^2$, $R^3$ and $R^4$, or $R^2$ and $R^3$ may combine with each other to form a carbocyclic or heterocyclic structure which may be a monocyclic or polycyclic structure resulting in forming an aromatic compound or aliphatic compound; m is 0 or a positive integer; and p is 0 or 1 (wherein when m is 0, p is also 0).

It is preferred that component (C) obtained from above-mentioned specific monomers containing one or more kinds of polar groups in its molecular structure from the viewpoints of compatibility or dispersibility of components (A) and (B), heat resistance, strength and excellent laser marking adaptability.

<Specific Monomers>

Preferred examples of specific monomers include monomers represented by above-mentioned general formula (1), wherein $R^1$ and $R^3$ independently represent hydrogen atoms or hydrocarbon groups each having 1 to 10 carbon atoms; $R^2$ and $R^4$ independently represent hydrogen atoms or monovalent organic groups; at least one of $R^2$ and $R^4$ represents a polar group other than a hydrogen atom and a hydrocarbon group; m is an integer of 0 to 3 (preferably from 0 to 2, and more preferably 1); p is 0.

Above-mentioned polar groups include a hydroxyl group, a carboxyl group, an alkoxy group having 1 to 15 carbon atoms, an acyloxy group having 1 to 15 carbon atoms, an alkoxycarbonyl group having 1 to 15 carbon atoms, an aryloxycarbonyl group having 1 to 15 carbon atoms, a cyano group, an amino group, an amido group, an imido cyclic structure containing group, a silyl group and a silyl group partially or completely substituted with a halogen atom, an alkoxy group, or an acyloxy group.

Of these, in particular, specific monomers having groups derived from alkoxycarbonyl group or an aryloxycarbonyl group each having 1 to 15 carbon atoms, each of which is represented by—$(CH_2)_nCOOR^5$ are preferred in that the thermoplastic resin compositions having high glass transition temperature and low moisture absorption are obtained. In above-mentioned formula relating to the groups derived from alkoxycarbonyl group or an aryloxycarbonyl group each having 1 to 15 carbon atoms, $R^5$ is a hydrocarbon group having 1 to 12 carbon atoms, and preferably an alkyl group. Further, n is usually from 0 to 5. Furthermore, the lower value of n is preferred, because the glass transition temperature of the resulting thermoplastic resin compositions is increased. Furthermore, the specific monomers in which n is 0 are preferred, because of easy synthesis thereof.

Examples of specific monomers represented by above-mentioned general formula (1) include following compounds:

Bicyclo[2.2.1]hepto-2-ene;
Tricyclo[5.2.1.0$^{2,6}$]-8-decene;
Tetracyclo[4.4.0.1$^{2,5}$.1$^{7,10}$]-3-dodecene;
Pentacyclo[6.5.1$^{3,6}$.0$^{2,7}$.0$^{9,13}$]-4-pentadecene;
Pentacyclo[7.4.0.1$^{2,5}$.1$^{9,12}$.0$^{8,13}$]-3-pentadecene;
Tricyclo[4.4.0.1$^{2,5}$]-3-undecene;
5-Methylbicyclo[2.2.1]hepto-2-ene;
5-Ethylbicyclo[2.2.1]hepto-2-ene;
5-Methoxycarbonylbicyclo[2.2.1]hepto-2-ene;
5-Methyl-5-methoxycarbonylbicyclo[2.2.1]hepto-2-ene;
5-Cyanobicyclo[2.2.1]hepto-2-ene;
8-ethyltetracyclo[4.4.0.1$^{2,5}$.1$^{7,10}$]-3-dodecene
8-Methoxycarbonyltetracyclo[4.4.0.1$^{2,5}$.1$^{7,10}$]-3-dodecene;
8-Ethoxycarbonyltetracyclo[4.4.0.1$^{2,5}$.1$^{7,10}$]-3-dodecene;
8-n-Propoxycarbonyltetracyclo[4.4.0.1$^{2,5}$.1$^{7,10}$]-3-dodecene;
8-Isopropoxycarbonyltetracyclo[4.4.0.1$^{2,5}$.1$^{7,10}$]-3-dodecene;
8-n-Butoxycarbonyltetracyclo[4.4.0.1$^{2,5}$.1$^{7,10}$]-3-dodecene;
8-Methyl-8-methoxycarbonyltetracyclo[4.4.0.1$^{2,5}$.1$^{7,10}$]-3-dodecene;
8-Methyl-8-ethoxycarbonyltetracyclo[4.4.0.1$^{2,5}$.1$^{7,10}$]-3-dodecene;
8-Methyl-8-n-propoxycarbonyltetracyclo[4.4.0.1$^{2,5}$.1$^{7,10}$]-3-dodecene;
8-Methyl-8-Isopropoxycarbonyltetracyclo[4.4.0.1$^{2,5}$.1$^{7,10}$]-3-dodecene;
8-Methyl-8-n-butoxycarbonyltetracyclo[4.4.0.1$^{2,5}$.1$^{7,10}$]-3-dodecene;
Dimethanooctahydronaphthalene;
Ethyltetracyclododecene;
6-Ethylidene-2-tetracyclododecene;
Trimethanooctahydronaphthalene;
Pentacyclo[8.4.0.1$^{2,5}$.1$^{9,12}$.0$^{8,13}$]-3-hexadecene;
Heptacyclo[8.7.0.1$^{3,6}$.1$^{10,17}$.1$^{12,15}$.0$^{2,7}$.0$^{11,16}$]-4-eicocene;
Heptacyclo[8.8.0.1$^{4,7}$.1$^{11,18}$.1$^{13,16}$.0$^{3,8}$.0$^{12,17}$]-5-heneicocene;
5-Ethylidenebicyclo[2.2.1]hepto-2-ene;
8-Ethylidenetetracyclo[4.4.0.1$^{2,5}$.1$^{7,10}$]-3-dodecene;
5-Phenylbicyclo[2.2.1]hepto-2-ene;
8-Phenyltetracyclo[4.4.0.1$^{2,5}$.1$^{7,10}$]-3-dodecene;
5-Fluorobicyclo[2.2.1]hepto-2-ene;
5-Fluoromethylbicyclo[2.2.1]hepto-2-ene;
5-Trifluoromethylbicyclo[2.2.1]hepto-2-ene;
5-Pentafluoroethylbicyclo[2.2.1]hepto-2-ene;
5,5-Difluorobicyclo[2.2.1]hepto-2-ene;
5,6-Difluorobicyclo[2.2.1]hepto-2-ene;
5,5-Bis(trifluoromethyl)bicyclo[2.2.1]hepto-2-ene;
5,6-Bis(trifluoromethyl)bicyclo[2.2.1]hepto-2-ene;
5-Methyl-5-trifluoromethylbicyclo[2.2.1]hepto-2-ene;
5,5,6-Trifluorobicyclo[2.2.1]hepto-2-ene;
5,5,6-Tris(fluoromethyl)bicyclo[2.2.1]hepto-2-ene;
5,5,6,6-Tetrafluorobicyclo[2.2.1]hepto-2-ene;
5,5,6,6-Tetrakis(trifluoromethyl)bicyclo[2.2.1]hepto-2-ene;
5,5-Difluoro-6,6-bis(trifluoromethyl)bicyclo[2.2.1]hepto-2-ene;
5,6-Difluoro-5,6-bis(trifluoromethyl)bicyclo[2.2.1]hepto-2-ene;
5,5,6-Trifluoro-5-trifluoromethylbicyclo[2.2.1]hepto-2-ene;
5-Fluoro-5-pentafluoroethyl-6,6-bis(trifluoromethyl)bicyclo[2.2.1]hepto-2-ene;
5,6-Difluoro-5-heptafluoro-iso-propyl-6-trifluoromethylbicyclo[2.2.1]hepto-2-ene;
5-Chloro-5,6,6-trifluorobicyclo[2.2.1]hepto-2-ene;
5,6-Dichloro-5,6-bis(trifluoromethyl)bicyclo[2.2.1]hepto-2-ene;
5,5,6-Trifluoro-6-trifluoromethoxybicyclo[2.2.1]hepto-2-ene;
5,5,6-Trifluoro-6-heptafluoropropoxybicyclo[2.2.1]hepto-2-ene;
8-Fluorotetracyclo[4.4.0.1$^{2,5}$.1$^{7,10}$]-3-dodecene;
8-Fluoromethyltetracyclo[4.4.0.1$^{2,5}$.1$^{7,10}$]-3-dodecene;
8-Difluoromethyltetracyclo[4.4.0.1$^{2,5}$.1$^{7,10}$]-3-dodecene;
8-Trifluoromethyltetracyclo[4.4.0.1$^{2,5}$.1$^{7,10}$]-3-dodecene;
8-Pentafluoroethyltetracyclo[4.4.0.1$^{2,5}$.1$^{7,10}$]-3-dodecene;
8,8-Difluorotetracyclo[4.4.0.1$^{2,5}$.1$^{7,10}$]-3-dodecene;
8,9-Difluorotetracyclo[4.4.0.1$^{2,5}$.1$^{7,10}$]-3-dodecene;
8,8-Bis(trifluoromethyl)tetracyclo[4.4.0.1$^{2,5}$.1$^{7,10}$]-3-dodecene;
8,9-Bis(trifluoromethyl)tetracyclo[4.4.0.1$^{2,5}$.1$^{7,10}$]-3-dodecene;
8-Methyl-8-trifluoromethyltetracyclo[4.4.0.1$^{2,5}$.1$^{7,10}$]-3-dodecene;
8,8,9-Trifluorotetracyclo[4.4.0.1$^{2,5}$.1$^{7,10}$]-3-dodecene;
8,8,9-Tris(trifluoromethyl)tetracyclo[4.4.0.1$^{2,5}$.1$^{7,10}$]-3-dodecene;
8,8,9,9-Tetrafluorotetracyclo[4.4.0.1$^{2,5}$.1$^{7,10}$]-3-dodecene;
8,8,9,9-Tetrakis(trifluoromethyl)tetracyclo-[4.4.0.1$^{2,5}$.1$^{7,10}$]-3-dodecene;
8,8-Difluoro-9,9-bis(trifluoromethyl)tetracyclo-[4.4.0.1$^{2,5}$.1$^{7,10}$]-3-dodecene;
8,9-Difluoro-8,9-bis(trifluoromethyl)tetracyclo-[4.4.0.1$^{2,5}$.1$^{7,10}$]-3-dodecene;
8,8,9-Trifluoro-9-trifluoromethyltetracyclo-[4.4.0.1$^{2,5}$.1$^{7,10}$]-3-dodecene;
8,8,9-Trifluoro-9-trifluoromethoxytetracyclo-[4.4.0.1$^{2,5}$.1$^{7,10}$]-3-dodecene;
8,8,9-Trifluoro-9-pentafluoropropoxytetracyclo-[4.4.0.1$^{2,5}$.1$^{7,10}$]-3-dodecene;
8-Fluoro-8-pentafluoroethyl-9,9-bis(trifluoromethyl)-tetracyclo[4.4.0.1$^{2,5}$.1$^{7,10}$]-3-dodecene;
8,9-Difluoro-8-heptafluoroisopropyl-9-trifluoromethyl-tetracyclo[4.4.0.1$^{2,5}$.1$^{7,10}$]-3-dodecene;
8-Chloro-8,9,9-trifluorotetracyclo[4.4.0.1$^{2,5}$.1$^{7,10}$]-3-dodecene;
8,9-Dichloro-8,9-bis(trifluoromethyl)tetracyclo-[4.4.0.1$^{2,5}$.1$^{7,10}$]-3-dodecene;
8-(2,2,2-Trifluoroethoxycarbonyl)tetracyclo-[4.4.0.1$^{2,5}$.1$^{7,10}$]-3-dodecene; and
8-Methyl-8-(2,2,2-trifluoroethoxycarbonyl)tetracyclo-[4.4.0.1$^{2,5}$.1$^{7,10}$]-3-dodecene.

Further, silyl group-containing monomers include
5-trimethoxysilyl-2-norbornene,
5-dimethoxychlorosilyl-2-norbornene,
5-methoxychloromethylsilyl-2-norbornene,
5-methoxyhydridomethylsilyl-2-norbornene,
5-dimethoxyhydridosilyl-2-norbornene,
5-methoxydimethylsilyl-2-norbornene,
5-triethoxysilyl-2-norbornene,
5-diethoxychlorosilyl-2-norbornene,
5-ethoxychloromethylsilyl-2-norbornene,
5-diethoxyhydridosilyl-2-norbornene,
5-ethoxydimethylsilyl-2-norbornene,
5-ethoxydiethylsilyl-2-norbornene,
5-propoxydimethylsilyl-2-norbornene,
5-triphenoxysilyl-2-norbornene,
5-diphenoxymethylsilyl-2-norbornene,
5-trimethoxysilylmethyl-2-norbornene, 5-(2-trimethoxysilyl)ethyl-2-norbornene,
5-(2-dimethoxychlorosilyl)ethyl-2-norbornene,
5-(1-trimethoxysilyl)ethyl-2-norbornene,
5-(2-trimethoxysilyl)propyl-2-norbornene,
5-(1-trimethoxysilyl) propyl-2-norbornene,
5-triethoxysilylethyl-2-norbornene,
5-dimethoxymethylsilylmethyl-2-norbornene,
5-trimethoxypropylsilyl-2-norbornene,
trimethoxysilylpropyl-5-norbornene-2-carboxylate,
triethoxysilylpropyl-5-norbornene-2-carboxylate,
dimethoxymethylsilylpropyl-5-norbornene-2-carboxylate,
trimethoxysilylpropyl-2-methyl-5-norbornene-2-carboxylate,
dimethoxymethylpropyl-2-methyl-5-norbornene-2-carboxylate and
triethoxysilylpropyl-2-methyl -5-norbornene-2-carboxylate.

Of these specific monomers, 8-methyl-8-methoxycarbonyl-tetracyclo[$4.4.0.1^{2,5}.1^{7,10}$]-3-dodecene, 8-ethylidenetetracyclo-[$4.4.0.1^{2,5}.1^{7,10}$]-3-dodecene, 8-ethyltetracyclo[$4.4.0.1^{2,5}.1^{7,10}$]-3-dodecene and pentacyclo[$7.4.0.1^{2,5}.1^{9,12}.0^{8,3}$]-3-pentadecene are preferred in that the thermoplastic resin compositions having high glass transition temperature and low moisture absorption are obtained, and 8-methyl-8-methoxycarbonyltetracyclo-[$4.4.0.1^{2,5}.1^{7,10}$]-3-dodecene is particularly preferred.

Above-mentioned specific monomers do not necessarily need to be used alone, and the polymerization reaction can also be conducted using two or more of them.

<Copolymerizable Monomers>

In the polymerization process for obtaining component (C), above-mentioned specific monomers may be used alone, but specific monomers may be copolymerized with copolymerizable monomers.

Specific examples of copolymerizable monomers used in this case include olefin compounds each having 2 to 12 carbon atoms, preferably 2 to 8 carbon atoms, such as ethylene, propylene and butene, and cycloolefins such as cyclobutene, cyclopentene, cycloheptene, cyclooctene and dicyclopentadiene. The carbon number of the cycloolefins is preferably from 4 to 20, and more preferably from 5 to 12.

Further, specific monomers may be polymerized by ring-opening polymerization in the presence of unsaturated hydrocarbon polymers having carbon-carbon double bonds on main chains thereof, such as polybutadiene, polyisoprene, styrene-butadiene copolymers, ethylene-non-conjugated diene copolymers and polynorbornene. The hydrogenated products of the ring-opening polymers obtained in this case are useful as raw materials for resins having high impact resistance.

<Ring-Opening Polymerization Catalysts>

In the present invention, the ring-opening polymerization reaction is conducted in the presence of a metathesis catalyst.

The metathesis catalyst is a catalyst comprising a combination of (a) at least one selected from the compounds of W, Mo and Re and (b) at least one selected from the compounds of the group IA elements (for example, Li, Na and K) in Deming's periodic table, the group IIA elements (for example, Mg and Ca), the group IIB elements (for example, Zn, Cd and Hg), the group IIIB elements (for example, B and Al), the group IVA elements (for example, Ti and Zr) and the group IVB elements (for example, Si, Sn and Pb), each compound having at least one corresponding element-carbon bond or corresponding element-hydrogen bond. For enhancing the activity of the catalyst in this case, (c) additives described later may be added.

<Addition Polymerization Catalysts>

As addition polymerization catalysts, there are ordinarily used cationic complexes of the group 8 elements in the periodic table such as Ni, Pd and Co, or catalysts forming cationic complexes.

<Catalysts Used In Obtaining Saturated Copolymers>

As a catalyst used for the copolymerization reaction of specific monomers with compounds containing olefinic carbon-carbon double bonds, there is used a catalyst comprising a vanadium compound and an organic aluminum compound. The vanadium compounds include vanadium compounds represented by general formula $VO(OR)_a X_b$ or $V(OR)_c X_d$ (wherein R is a hydrocarbon group, $0 \leq a \leq 3$, $0 \leq b \leq 3$, $2 \leq (a+b) \leq 3$, $0 \leq c \leq 4$, $0 \leq d \leq 4$ and $3 \leq (c+d) \leq 4$), and electron donor addition products thereof. The electron donors include oxygen-containing electron donors such as alcohols, phenols, ketones, aldehydes, carboxylic acids, esters of organic acids or inorganic acids, ethers, acid amides, acid anhydrides and alkoxysilanes, and nitrogen-containing electron donors such as ammonia, amines, nitrites and isocyanates. As a component of the organic aluminum compound catalyst, there is used at least one selected from components each having at least one aluminum-carbon bond or aluminum-hydrogen bond.

As to the ratio of the catalyst components, the mole ratio of aluminum atoms to vanadium atoms (Al/V) is 2 or more, preferably from 2 to 50, and particularly from 3 to 20.

<Molecular Weight Modifiers>

Molecular weight of the polymer can be modified by the polymerization temperature, the kind of catalyst and the kind of solvent. In the present invention, however, it is preferred that one or more molecular weight modifiers are allowed to coexist in the reaction system, thereby modifying molecular weight of the polymer.

Preferred examples of molecular weight modifiers include α-olefins such as ethylene, propene, 1-butene, 1-pentene, 1-hexene, 1-heptene, 1-octene, 1-nonene and 1-decene, and styrene. Of these, particularly preferred are 1-butene and 1-hexene.

These molecular weight modifiers can be used either alone or as a mixture of two or more of them.

The amount of molecular weight modifiers used for obtaining the polymer is from 0.005 mole to 0.6 mole, and preferably from 0.02 mole to 0.5 mole, per mole of specific monomers used in the ring-opening polymerization reaction.

<Solvents for Polymerization Reaction>

Solvents used for the polymerization reaction (solvents for solving the specific monomers, polymerization catalysts and molecular weight modifiers) include, for example, alkanes such as pentane, hexane, heptane, octane, nonane and decane; cycloalkanes such as cyclohexane, cycloheptane, cyclooctane, decalin and norbornane; aromatic hydrocarbons such as benzene, toluene, xylene, ethylbenzene and cumene; alkane halides such as chlorobutane, bromohexane, methylene chloride, dichloroethane, hexamethylene dibromide, chlorobenzene, chloroform and tetrachloroethylene; compounds such as halogenated aromatic compounds; saturated carboxylic acid esters such as ethyl acetate, n-butyl acetate, iso-butyl acetate and methyl propionate; and ethers such as dibutyl ether, tetrahydrofuran and dimethoxyethane. These can be used either alone or as a mixture of two or more of them. Of these, preferred are aromatic hydrocarbons.

In the polymerization reaction, "solvents:specific monomers ratio (weight ratio)" is usually 1:1 to 10:1, preferably 1:1 to 5:1.

Molecular weight of the polymer used in the present invention as Component (C) is suitably within the range of 0.2 to 5 in terms of the intrinsic viscosity [η].

<Hydrogenation Catalysts>

Polymers obtained as described above can be used as component (C), as such. However, when they have carbon-carbon unsaturated bonds except for aromatic double bonds such as olefinic double bonds, it is preferred that they are hydrogenated before used as component (C).

The hydrogenation reaction is conducted by conventional methods. That is to say, hydrogenation catalysts are added to solutions of the polymer, and hydrogen gas of ordinary pressure to 300 atm., preferably 3 to 200 atm., is allowed to act thereon at 0° C. to 200° C., preferably 20° C. to 180° C.

As hydrogenation catalysts, there can be used catalysts employed in the ordinary hydrogenation reaction of olefinic compounds. Heterogeneous catalysts and homogeneous are known as hydrogenation catalysts.

Heterogeneous catalysts include solid catalysts in which precious metal catalytic substances such as palladium, platinum, nickel, rhodium and ruthenium are carried on carriers such as carbon, silica, alumina and titania. Homogeneous catalysts include
nickel naphthenate/triethylaluminum,
nickel acetylacetonato/triethylaluminum,
cobalt octenate/n-butyllithium,
titanocene dichloride/diethylaluminum monochloride,
rhodium acetate,
chloro-tris(triphenylphosphine)rhodium,
dichloro-tris(triphenylphosphine)ruthenium,
chlorohydrocarbonyltris(triphenylphosphine)ruthenium and
dichlorocarbonyl-tris(triphenylphosphine)ruthenium.

The form of the catalysts may be either powdery or glandular.

These hydrogenation catalysts are preferably used in such an amount as to give "polymer:hydrogenation catalyst ratio (weight ratio)" of $1:1\times10^{-6}$ to 1:2.

Hydrogenated polymers thus obtained by hydrogenation have excellent heat stability, and it does not happen to deteriorate in their properties by heating in shaping and in using as manufactured goods. Here, the hydrogenation rate is usually 50% or more, preferably 70% or more, more preferably 90% or more, particularly preferably 95% or more, and especially 98% or more.

The intrinsic viscosity [η] of component (C) used in the present invention, which is measured in chloroform at 30° C., is preferably from 0.2 dl/g to 5 dl/g, and more preferably from 0.4 dl/g to 4 dl/g. Exceeding 5 dl/g results in too high solution viscosity to cause deterioration of processability, whereas less than 0.2 dl/g sometimes causes a problem in strength of a shaped article.

As to molecular weight of component (C), the number average molecular weight (Mn) and the weight average molecular weight (Mw) in terms of polystyrene, which are measured by gel permeation chromatography (GPC), are preferably from 5,000 to 1,000,000, and from 10,000 to 3,000,000, respectively. Further, component (C) having a number average molecular weight (Mn) of 8,000 to 700,000 and a weight average molecular weight (Mw) of 20,000 to 1,000,000 is suitable.

Component (D): Styrenic Polymers

Styrenic polymers are polymers of aromatic vinyl compounds or copolymers of aromatic vinyl compounds and monomers copolymerizable therewith.

Aromatic vinyl compounds include compounds described in the description of above-mentioned component (A), such as styrene and α-methylstyrene. Copolymerizable monomers include monomers described in the description of above-mentioned component (B) (excluding (meth)acrylic acid compounds and derivatives thereof), such as maleimide compounds, vinyl cyanide compounds and maleic anhydride.

Of these, preferred examples of aromatic vinyl compounds are styrene and α-methylstyrene, and a preferred example of copolymerizable monomers is acrylonitrile.

The content of aromatic vinyl compounds in component (D) is preferably from 20% to 100% by weight, more preferably from 30% to 95% by weight, and particularly preferably from 35% to 90% by weight.

<Thermoplastic Resin Composition>

As to the respective thermoplastic resin composition of the present invention, the ratio of components and properties thereof will be described.

<Composition I>

Composition I is a thermoplastic resin composition containing component (A), component (B) and component (C).

Composition I contains, preferably, 1 part to 95 parts by weight of component (A), 1 part to 90 parts by weight of component (B) and 1 part to 95 parts by weight of component (C), more preferably, 10 parts to 80 parts by weight of component (A), 2 parts to 50 parts by weight of component (B) and 10 parts to 80 parts by weight of component (C), and particularly preferably 30 parts to 50 parts by weight of component (A), 10 parts to 30 parts by weight of component (B) and 30 parts to 50 parts by weight of component (C) (wherein (A)+(B)+(C)=100 parts by weight).

Thermoplastic resin compositions within these ranges have high heat resistance, good impact resistance and excellent laser marking adaptability.

<Composition II>

Composition II is a thermoplastic resin composition containing component (A), component (B), component (C) and component (D) described above.

Composition II contains, preferably, 1 part to 95 parts by weight of component (A), 1 part to 90 parts by weight of component (B), 1 part to 95 parts by weight of component (C) and 1 part to 95 parts by weight of component (D), more preferably, 30 parts to 50 parts by weight of component (A), 10 parts to 40 parts by weight of component (B), 30 parts to 60 parts by weight of component (C) and 5 parts to 15 parts by weight of component (D), and particularly preferably 30 parts to 40 parts by weight of component (A), 5 parts to 25 arts by weight of component (B), 30 parts to 60 parts by weight of component (C) and 10 parts to 20 parts by weight of component (D) (wherein (A)+(B)+(C)+(D)=100 parts by weight).

Thermoplastic resin compositions within these ranges have high heat resistance, good impact resistance and excellent in laser marking properties.

Compositions I and II can be obtained by kneading components (A) to (C) and components (A) to (D), respectively, using any one of various extruders, Banbury mixers, kneader rolls and the like at a temperature of 250° C. to 350° C. More simply, the respective components can be directly melted and kneaded in a forming machine to form shaped articles.

For improving compatibility or dispersibility of respective components in the composition in melting and kneading, unsaturated compounds having a specific functional group such as an epoxy group, a carboxyl group, a hydroxyl group, an amino group, an acid anhydride or an oxazoline can be added, and an organic peroxide can further be added as needed. Unsaturated compounds containing a specific functional group are preferably added in an amount within the range of 0.01% to 30% by weight based on the whole composition.

In addition to above-mentioned indispensable components for the thermoplastic resin composition of the invention, other polymers can be appropriately added to the thermoplastic resin composition, depending on the performance required. Such polymers are selected from, for example, polystyrene, polyethylene, polypropylene, polymethyl methacrylate, styrene-methyl methacrylate copolymers, polycarbonates, polyamides, polybutylene terephthalate, polyethylene terephthalate, polysulfones, polyphenylene ethers, polyethersulfone polyimides, polyphenyl sulfide, polyether ether ketones and vinylidene fluoride polymers.

Further, thermoplastic elastomers, rubber polymers, fine organic particles and fine inorganic particles may be added to the thermoplastic resin composition of the present invention.

Furthermore, various additives can be added to the thermoplastic resin composition of the present invention as needed. For example, antioxidants as mentioned below can be used.

2,6-di-t-butyl-4-methylphenol,
2,2'-dioxy-3,3'-di-t-butyl-5,5'-dimethyldiphenylmethane,
tetrakis[methylene-3-(3,5-di-t-butyl-4-hydroxyphenyl)-propionate]methane,
1,1,3-tris(2-methyl-4-hydroxy-5-t-butylphenyl)butane,
1,3,5-trimethyl-2,4,6-tris(3,5-di-t-butyl-4-hydroxy-benzyl)benzene,
stearyl-β-(3,5-di-t-butyl-4-hydroxyphenyl) propionate,
2,2'-dioxy-3,3'-di-t-butyl-5,5'-diethylphenylmethane,
3,9-bis[1,1-dimethyl-2-(β-(3-t-butyl-4-hydroxy-5-methylphenyl)propionyloxy)ethyl],
2,4,8,10-tetraoxospiro[5,5]undecane,
tris(2,4-di-t-butylphenyl) phosphite,
cyclicneopentanetetraylbis(2,4-di-t-butylphenyl)phosphite,
cyclicneopentanetetraylbis(2,6-di-t-butylphenyl)phosphite and 2,2-methylenebis(4,6-di-t-butylphenyl)octyl phosphite, etc.

Ultraviolet absorbers such as 2,4-dihydroxybenzophenone, 2-hydroxy-4-methoxybenzophenone, p-t-butylphenyl salicylate, 2,2'-dihydroxy-4-methoxybenzophenone and 2-(2'-hydroxy-4'-m-octoxyphenyl)benzotriazole, etc. can also be used.

The addition of such additives can stabilize the thermoplastic resin composition. Further, for improving processability, additives such as lubricants can also be added. Examples of lubricants include, for example, paraffin wax, stearic acid, hardened oil, stearylamide, methylenebisstearylamide, n-butyl stearate, ketone wax, octyl alcohol and hydroxystearic acid triglyceride.

These additives are added usually in an amount of 0.1 part to 3 parts by weight, preferably in an amount of 0.2 part to 2 parts by weight, based on 100 parts by weight of the thermoplastic resin composition.

Other additives include, for example, flame retardants such as antimony oxide, aluminum hydroxide, zinc borate, tricresyl phosphate, tris(dichloropropyl) phosphate, chlorinated paraffin, tetrabromobutane, hexabromobenzene and tetrabromobisphenol A; and antistatic agents such as stearylamidopropyldimethyl-β-hydroxyethyl and ammonium nitrate. Further, known plasticizers and antistatic agents can also be used.

Further, fillers such as glass fiber, carbon fiber, glass beads, asbestos, wollastonite, calcium carbonate, talc, barium sulfate, mica, potassium titanate, fluororesins and molybdenum disulfide can be added to the thermoplastic resin composition of the present invention at the time of their use. These fillers may be used either alone or as a combination of two or more of them. Of these, glass fiber and carbon fiber having a fiber diameter of 6 $\mu$m to 60 $\mu$m and a fiber length of 30 $\mu$m or more are preferably used. It is preferred that these fillers are contained in an amount of 1 part to 150 parts by weight based on 100 parts by weight of thermoplastic resin composition.

Component (E): Coloring Agents

Coloring agents are added to the composition of the present invention, thereby allowing laser beams to be absorbed by surfaces of the resins, and converting light energy to heat energy to conduct marking.

Component (E) includes organic pigments, inorganic pigments and dyes.

As organic pigments, there can be used, for example, azo pigments such as monoazo compounds of the acetoacetallylide family, the pyrazolone family, the 2,3-oxonaphthoylarylamide family, the barbituric acid family, the 2,4,6-triamino-1,3-pyrimidine family and the 3-cyano-4-methylpyridone family, and metal salts of azo compounds; diazo pigments such as diazo compounds of the acetoacetallylide family, the pyrazolone family and the 2,3-oxonaphthoylarylamide family; and other organic pigments such as copper phthalocyanine, chlorinated lead phthalocyanine and ultramarine.

Inorganic pigments include, for example, iron oxide red, Titanium Yellow, Titanium Black, Ketjen Black, black iron oxide, graphite, carbon black, titanium oxide, copper chromate, zinc sulfide, barium sulfate and calcium carbonate.

Dyes include, for example, anthraquinone dyes and carbon black-containing black dyes.

Component (E) is added in an amount of 0.001 part to 5 parts by weight, preferably in an amount of 0.01 part to 4 parts by weight, more preferably in an amount of 0.5 part to 3 parts by weight, based on 100 part by weight of the thermoplastic resin composition of the present invention.

Thermoplastic resin compositions of the present invention and shaped articles thereof are excellent in heat resistance, strength and processability, and excellent in marking adaptability by laser beams. They are therefore useful for various applications.

Accordingly, thermoplastic resin compositions of the present invention can be formed into various shaped articles by injection molding, sheet-extrusion molding, vacuum forming, deformation molding, foam molding, press molding, stampable molding and so on.

Various shaped articles obtained herein can be used for automotive exterior members and interior members, various electric and electronic parts, housing and optical materials, utilizing their excellent properties.

Thermoplastic resin compositions of the present invention are excellent in laser marking properties, so that lines can be drawn easily and finely on surfaces of shaped articles obtained therefrom.

As to the conditions of laser marking, an Nd:YAG laser is used, the frequency is from 2 KHz to 7 KHz, the current value is 12 Amp to 18 Amp, and the scanning speed is from 400 mm/sec to 800 mm/sec.

Thermoplastic resin compositions of the present invention can be effectively used for electric parts, electronic parts, automotive parts and cases for various recording media, on which printing is made.

The present invention will be illustrated with reference to examples in more detail below, but it is to be understood that the invention is not limited to the following examples except as defined in the appended claims. "Parts" and "percentages" in the following examples and comparative examples mean "parts by weight" and "percentages by weight", unless otherwise specified.

The respective properties were measured by the following methods:

Izod Impact Strength (IMP)

Izod impact strength was measured in accordance with ASTM D256, using a ¼ inch-thick test piece with a notch at 23° C. Unit: Kgf-cm/cm Heat Distortion Temperature (HDT)

Heat distortion temperature was measured in accordance with ASTM D648, using a ½ inch-thick test piece at a loading of 18.6 kg/cm$^2$. Unit: ° C.

Rockwell Hardness (RH)

Rockwell hardness was measured in accordance with ASTM D735, using two ⅛ inch-thick test pieces overlaid with each other and the R scale.

Melt Flow Rate (MFR)

Melt flow rate was measured in accordance with JIS K7210 under the test conditions of a temperature of 240° C. and a loading of 5 kg. Unit: g/10 min Laser Marking Properties Using an Nd:YAG (wavelength: 1064 nm) laser marker (Model RSM30D, manufactured by Rofin Marubeni Laser Co., Ltd.), a laser beam was scanned on a surface of a shaped plate (40 mm×80 mm×3.2 mm) of a composition to make printing.

The luminance of a printed area and that of a non-printed area were measured using a luminance meter (LS100, manufactured by Minolta Co., Ltd.), and the laser marking properties were evaluated from the luminance ratio according the following criterion:

○: the luminance of the non-printed area:the luminance of the printed area=more than 1:5

Δ: the luminance of the non-printed area:the luminance of the printed area=1:3 to 1:5

×: the luminance of the non-printed area:the luminance of the printed area=less than 1:3

EXAMPLES 1 TO 9 AND COMPARATIVE EXAMPLES 1 AND 2

Component (A)

ABS resin; Copolymer of acrylonitrile 22%/butadiene rubber 12%/styrene 66% (melt flow rate=15 g/10 min)

MABS resin; Copolymer of methyl methacrylate 58%/ acrylonitrile 5%/ butadiene rubber 18%/ styrene 19% (melt flow rate=26 g/10 min)

AES resin; Copolymer of acrylonitrile 23%/ethylene-propylene rubber 12%/styrene 65% (melt flow rate=15 g/10 min)

ASiS resin; Acrylonitrile/silicone rubber/styrene copolymer (melt flow rate=4 g/10 min)

AAS resin; Acrylonitrile/acrylic rubber/styrene copolymer (melt flow rate=5 g/10 min)

Component (B)

PMMA resin; Methyl methacrylate polymer (melt flow rate=2 g/10 min)

MS resin; Copolymer of methyl methacrylate 80%/ styrene 20% (melt flow rate=2 g/10 min)

Component (E)

Titanium Black; manufactured by MITSUBISHI MATERIALS CORPORATION

Additives

Irganox; manufactured by Ciba Specialty Chemicals K.K.

Component (C)

Synthesis Example 1

A reaction vessel the inside of which was replaced with nitrogen was charged with 250 parts of 8-methyl-8-carboxymethyltetracyclo[4.4.0.1$^{2,5}$.1$^{7,10}$]-3-dodecene (specific monomer), 18 parts of 1-hexene (molecular weight modifier) and 750 parts of toluene, and this solution was heated to 60° C. with stirring. Then, 0.62 part of a solution of triethylaluminum in toluene (concentration: 1.5 moles/ liter) and 3.7 parts of a solution of tungsten hexachloride modified with t-butanol and methanol (t-butanol:methanol:tungsten 0.35 mole:0.3 mole:1 mole) in toluene (concentration: 0.05 mole/liter) were added as polymerization catalysts to the solution in the reaction vessel, and the mixture was stirred with heating at 80° C. for 3 hours, thereby allowed to react by ring-opening polymerization to obtain a solution of a ring-opening polymer. The polymerization conversion in this polymerization reaction was 97%. The intrinsic viscosity [η] of the resulting ring-opening polymer, which was measured in chloroform at 30° C., was 0.65 dl/g.

An autoclave was charged with 4,000 parts of the solution of the ring-opening polymer thus obtained, and 0.48 part of RuHCl(CO)[P(C$_6$H$_5$)$_3$]$_3$ was added to this ring-opening polymer solution, followed by stirring with heating under conditions of a hydrogen gas pressure of 100 kg/cm$^2$ and a reaction temperature of 165° C. for 3 hours to conduct the hydrogenation reaction.

After the resulting reaction solution (hydrogenated polymer solution) was cooled, the hydrogen gas pressure was released.

This reaction solution was poured into a large amount of methanol to separate and recover a coagulum, which was dried to obtain a hydrogenated polymer (specific cyclic polyolefin resin) (hereinafter referred to as "resin (a)").

As to resin (a) thus obtained, the hydrogenation rate was measuredusing $^1$H-NMR. As a result, it was 99.9%. Further, the glass transition temperature (Tg) of resin (a) was measured by the DSC method. As a result, it was 170° C. Still further, with respect to resin (a), the number average molecular weight (Mn) and the weight average molecular weight (Mw) in terms of polystyrene were measured by the GPC method. As a result, the number average molecular weight (Mn) was 39,000, the weight average molecular weight (Mw) was 116,000, and the molecular weight distribution (Mw/Mn) was 2.97. Yet still further, as to resin (a), the moisture absorption at 23° C. was measured. As a result, it was 0.4%. Furthermore, the intrinsic viscosity [η] of resin (a) was measured in chloroform at 30° C. As a result, it was 0.67 dl/g.

Synthesis Example 2

A reaction vessel having a volume of 1 liter was charged with 93.75 millimoles of 5-n-hexyl-2-norbornene, 500 millimoles of 2-norbornene and 31.25 millimoles of 5-triethoxysilyl-2-norbornene as monomers, 500 g of cyclohexane as a solvent, and 3.1 millimoles of a molecular weight modifier (1-hexene) in an atmosphere of nitrogen. The reaction mixture was kept at 10° C., and 0.25 millimole of nickel octanoate [Ni(octanoate)$_2$], 0.5 millimole of trityltetrakis(pentafluorophenyl) borate [Ph$_3$C·B(C$_6$F$_5$)$_3$] and 1.0 millimole of triethylaluminum were added thereto, followed by polymerization. The polymerization was conducted at 20° C. for 2 hours, and terminated with methanol. The conversion ratio to a copolymer was 85%. Then, 6 g of lactic acid was added to the copolymer solution to allow it to react with the catalyst components. The copolymer solution was poured into 4 liters of isopropanol to coagulate the copolymer, and the unreacted monomers and catalyst residues were removed. The coagulated copolymer was dried to obtain the copolymer.

Analysis of the copolymer by $^1$H-NMR at 270 MHz (methylene absorption of an ethoxysilyl group at 4 ppm, solvent: deuterated toluene, TMS standard) showed that the content of a structure derived from 5-triethoxysilyl-2-norbornene was 4.8 mol %. The content of a structure derived from 5-n-hexyl-2-norbornene was 14.0 mol % from a calibration curve by characteristic absorption at 721 cm$^{-1}$ in infrared absorption spectrum analysis. The copolymer had a number average molecular weight of 220,000 and a weight average molecular weight of 350,000 in terms of polystyrene.

Above-mentioned respective components were compounded according to formulations shown in Table 1 to obtain thermoplastic resin compositions. Properties of the resulting thermoplastic resin compositions are also shown in Table 1.

TABLE 1

|  | Examples |  |  |  |  |  |  |  |  | Comparative Examples |  |
|---|---|---|---|---|---|---|---|---|---|---|---|
|  | 1 | 2 | 3 | 4 | 5 | 6 | 7 | 8 | 9 | 1 | 2 |
| Compounding Ratio (parts) | | | | | | | | | | | |
| Component (A): | | | | | | | | | | | |
| ABS | 30 | 0 | 0 | 0 | 0 | 0 | 0 | 0 | 0 | 0 | 0 |
| MABS | 0 | 30 | 40 | 30 | 40 | 40 | 0 | 0 | 0 | 80 | 0 |
| AES | 0 | 0 | 0 | 0 | 0 | 0 | 30 | 30 | 0 | 0 | 0 |
| ASiS | 0 | 0 | 0 | 0 | 0 | 0 | 0 | 0 | 0 | 0 | 0 |
| AAS | 0 | 0 | 0 | 0 | 0 | 0 | 0 | 0 | 30 | 0 | 0 |
| Component (B): | | | | | | | | | | | |
| PMMA | 20 | 20 | 20 | 20 | 20 | 0 | 20 | 20 | 20 | 0 | 0 |
| MS | 0 | 0 | 0 | 0 | 0 | 20 | 0 | 0 | 0 | 20 | 40 |
| Component (C): | | | | | | | | | | | |
| Synthesis Example 1 | 50 | 50 | 40 | 50 | 40 | 40 | 50 | 50 | 50 | 0 | 60 |
| Synthesis Example 2 | 0 | 0 | 0 | 0 | 0 | 0 | 0 | 0 | 0 | 0 | 0 |
| Component (E) | 0.1 | 0.1 | 0.1 | 0.1 | 0.1 | 0.1 | 0.1 | 0.1 | 0.1 | 0.1 | 0.1 |
| Stabilizer (Irganox 1010) | 0.1 | 0.1 | 0.1 | 0.1 | 0.1 | 0.1 | 0.1 | 0.1 | 0.1 | 0.1 | 0.1 |
| Properties | | | | | | | | | | | |
| IMP (kg · cm/cm) | 10 | 8 | 9 | 8 | 9 | 8 | 6 | 5 | 4 | 6 | 2 |
| HDT (° C.) | 110 | 103 | 100 | 103 | 107 | 106 | 109 | 110 | 110 | 90 | 120 |
| RH (R scale) | 110 | 113 | 115 | 113 | 115 | 114 | 110 | 109 | 110 | 112 | 100 |
| MFR (g/10 min) | 5 | 4 | 5 | 4 | 5 | 6 | 3 | 2 | 2 | 20 | 2 |
| Laser Marking Properties | ○ | ○ | ○ | ○ | ○ | ○ | ○ | ○ | ○ | Δ | Δ |

What is claimed is:

1. A thermoplastic resin composition, comprising:

(A): one or more rubber reinforced thermoplastic resins;

(B): one or more acrylic resins; and (C): one or more thermoplastic norbornene resins.

2. The thermoplastic resin composition according to claim 1, which contains 1 part to 95 parts by weight of (A), 1 part to 90 parts by weight of (B) and 1 part to 95 parts by weight of (C);

wherein (A)+(B)+(C)=100 parts by weight.

3. The thermoplastic resin composition according to claim 1, which contains 10 parts to 80 parts by weight of (A), 2 parts to 50 parts by weight of (B), and 10 parts to 80 parts by weight of (C);

wherein (A)+(B)+(C)=100 parts by weight.

4. A thermoplastic resin composition, comprising:

(A): one or more rubber reinforced thermoplastic resins;

(B): one or more acrylic resins;

(C): one or more thermoplastic norbornene resins; and (D): one or more styrenic resins other than (A).

5. The thermoplastic resin composition according to claim 4, which contains 1 part to 95 parts by weight of (A), 1 part to 90 parts by weight of (B), 1 part to 95 parts by weight of (C) and 1 part to 95 parts by weight of (D);

wherein (A)+(B)+(C)+(D)=100 parts by weight.

6. The thermoplastic resin composition according to claims 1 or 4, wherein (A) is a rubber reinforced styrenic resin.

7. The thermoplastic resin composition according to claim 6, wherein (C) is a polymer obtained by polymerization of a monomer composition containing at least one monomer represented by the following formula (1):

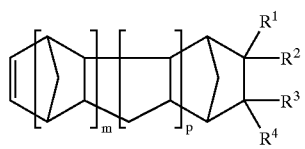

wherein $R^1$ to $R^4$ independently represent a hydrogen atom, a halogen atom, a substituted or unsubstituted hydrocarbon group or other polar group each having 1 to 30 carbon atoms which may have a linkage group containing one or more oxygen, nitrogen, sulfur or silicon atoms;

$R^1$ and $R^2$, $R^3$ and $R^4$, or $R^2$ and $R^3$ may combine with each other to form a carbocyclic or heterocyclic structure which may be a monocyclic or polycyclic structure resulting in forming an aromatic compound or aliphatic compound;

m is 0 or a positive integer; and p is 0 or 1;

wherein when m is 0, p is also 0.

8. The thermoplastic resin composition according to claim 7, wherein (C) has at least one polar group in its molecule.

9. The thermoplastic resin composition according to claim 7, further comprising (E): a coloring agent.

10. A shaped article obtained by forming the thermoplastic resin composition according to claims 1 or 4.

11. A shaped article according to claim 10, wherein a marking is made with a laser beam.

* * * * *